(12) United States Patent
Chang

(10) Patent No.: US 7,450,276 B2
(45) Date of Patent: *Nov. 11, 2008

(54) SCANNING APPARATUS

(76) Inventor: Yu-Shan Chang, No. 1-2, Sec. 3, Wuchiuan W. Rd., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/505,563

(22) Filed: Aug. 16, 2006

(65) Prior Publication Data
US 2007/0053019 A1    Mar. 8, 2007

Related U.S. Application Data

(63) Continuation of application No. 10/263,183, filed on Oct. 3, 2002, now Pat. No. 7,116,451.

(51) Int. Cl.
*H04N 1/04* (2006.01)
*H01B 7/08* (2006.01)

(52) U.S. Cl. ............ 358/497; 358/474; 358/483; 174/117 FF

(58) Field of Classification Search .......... 358/471, 358/474, 483, 482, 497, 487, 505, 506, 512–514, 358/208.1, 234–236, 216, 239, 211, 212, 358/99 R, 117 F, 117 A, 117 FF; 382/312, 382/318, 319; 250/208.1, 234–236, 216, 250/239; 399/211, 212; 174/99 R, 117 F, 174/117 A, 117 FF See application file for complete search history.

(56) References Cited

U.S. PATENT DOCUMENTS

| | | | |
|---|---|---|---|
| 6,552,272 B1 | 4/2003 | Sheng et al. | |
| 6,576,840 B1 | 6/2003 | Huang et al. | |
| 6,953,898 B2 | 10/2005 | Chen et al. | |
| 6,975,436 B2 | 12/2005 | Saito | |
| 7,095,532 B2 * | 8/2006 | Chang | 358/471 |
| 7,116,451 B2 * | 10/2006 | Chang | 358/497 |
| 2005/0011665 A1 * | 1/2005 | Youngers et al. | 174/117 F |

FOREIGN PATENT DOCUMENTS

JP    2005115031 A    4/2005

* cited by examiner

*Primary Examiner*—Cheukfan Lee
(74) *Attorney, Agent, or Firm*—Stolowitz Ford Cowger LLP

(57) ABSTRACT

A scanning apparatus includes a housing with a scan flatbed. A loading glass is installed at the scan flatbed of the housing for loading a to-be-scanned document. A photoelectric sensing device senses the light corresponding to the to-be-scanned document to generate electric signals. The electric signals are transmitted through a flat cable to a motherboard. The flat cable is designed to include a line peak so that the surface friction between the flat cable and the loading glass can be reduced to line friction. The flat cable can also be shifted near the sidewall of the housing and is inclined to the center of the housing so that the friction traces remained on the loading glass is outside the scan flatbed. Thus, the abrasion on the loading glass can be reduced and the quality of the scanning images can be improved.

34 Claims, 6 Drawing Sheets

SCANNING APPARATUS

CROSS-REFERENCE TO RELATED APPLICATIONS

This is a Continuation Patent Application of U.S. patent application Ser. No. 10/263,183, filed Oct. 3, 2002 now U.S. Pat. No. 7,116,451.

BACKGROUND OF THE INVENTION

1. Field of the Invention

The invention relates in general to a scanning apparatus, and more particularly to a scanning apparatus, which can improve the quality of scanning images by reducing the abrasion of the glass surface at the scan flatbed.

2. Description of the Related Art

With the progress and evolution of technology, the integration and application of multi-media have become the current trend. Multimedia is the use of computers to present different types of information, such as text, images and sound, in an integrated way. Several multi-media devices capable of capturing images and sounds are therefore developed. In terms of the image processing, the scanning apparatus is a common tool for users to capture images.

Referring to FIG. 1A, a lateral view of a conventional flatbed scanner is shown. The flatbed scanner-includes a housing 102, and a cover 104. The housing 102 includes a scan flatbed 106 or a so-called window area. A loading glass 108 is installed at the scan flatbed 106 for loading a to-be-scanned document 111. The scanning operation is performed as the following. The to-be-scanned document 111 is placed on the scan flatbed 106 and then the cover 104 is closed. A photoelectric sensing device 110 in the housing 102 is driven to sense the to-be-scanned document 111. A light-sensing module 112 in the photoelectric sensing device 110 then transforms the received image signals to electric signals. The electric signals are further transmitted to a motherboard 116 by a flat cable 114 so that the images sensed by the light-sensing module 112 can be output. The light-sensing module 112 can be a charge coupled device (CCD) or a contact image sensor (CIS) to achieve the above-mentioned purpose.

After the first signals in the light-sensing module 112 are output, the photoelectric sensing device 110 is further shifted slightly to scan the left part of the to-be-scanned document 111 by a step motor (not shown). Subsequently, the light-sensing module 112 is driven again to sense the to-be-scanned document 111. The sensed image signals are then transmitted by the flat cable 114 and output by the motherboard 116. By performing the procedure mentioned above repeatedly, the scanning progress can be completed step by step. The procedures described above can be applied to both reflective documents and transmissive documents since these two kinds of documents are different in the locations of the light sources (not shown) but the same in the progress of photoelectric sensing devices 110 to sense the documents and in the connection between the photoelectric sensing device 110 and the flat cable 114. Therefore, the theorems for capturing images of two kinds of documents are also the same.

Referring to FIG. 1A and FIG. 1B, a structural diagram of the connection between the photoelectric sensing device and the motherboard in a conventional flatbed scanner is shown. The flat cable 114, which is usually a soft cable, is located under the loading glass 108. The flat cable 114 is bent around the bottom of photoelectric sensing device 214; one terminal A of the flat cable 114 is connected to the photoelectric sensing device 110, and the other terminal B is connected to the motherboard 116. Therefore, in the natural condition, the flat cable 114 will form a raised part 118 with a height h. Because scanners nowadays are designed to be thinner and thinner, when scanners are fabricated, the raised part 118 of the flat cable 114 will easily touch the loading glass 108 at the scan flatbed 106 as shown in FIG. 1C. Subsequently, when the step motor drives photoelectric sensing device 110 to pre-scan or scan the to-be-scanned document 111, the raised part 118 of the flat cable 114 will rub against the loading glass 108 and result in friction traces at the loading glass 108 as time goes by. The friction traces on the loading glass 108 will obscure the light to penetrate and result in shadow traces on the scanning images. Therefore, the quality of scanning images is reduced largely.

SUMMARY OF THE INVENTION

It is therefore an object of the invention to provide a scanning apparatus, using the design of the fold line on the flat cable to change the surface touch between the flat cable and the loading glass to a line touch. Therefore, the friction between the flat cable and the loading glass can be reduced and then the quality of scanning images be improved.

The invention achieves the above-identified objects by providing a scanning apparatus. The scanning apparatus includes a housing with a scan flatbed. A loading glass is installed at the scan flatbed for loading a to-be-scanned document. A photoelectric sensing device is set up in the housing for sensing the light corresponding to the to-be-scanned document and transforming light signals into electric signals. Lastly, a circuit board is installed in the housing for outputting the electric signals. In addition, a flat cable connects the photoelectric sensing device to the circuit board for transmitting the electric signals. The photoelectric sensing device is driven to scan the to-be-scanned document by repeating the procedure mentioned above and the scanning image is output to complete the scanning progress. The flat cable includes a line peak and only the line peak of the flat cable will touch the loading glass as the photoelectric sensing device is driven.

The invention achieves the above-identified objects by providing another scanning apparatus. By means of adjusting the location of the photoelectric sensing device and inclining the flat cable, the friction traces on the loading glass can be shifted outside the scan flatbed so that the no shadow traces will produce on the scanning image of the to-be-scanned document and the quality of the scanning image can be optimized.

According to the objective of the invention, a scanning apparatus is further provided. The top on the housing of the scanning apparatus includes a scan flatbed, and a loading glass is installed at the scan flatbed for loading a to-be-scanned document. A photoelectric sensing device is set up in the housing for sensing the light corresponding to the to-be-scanned document and transforming light signals into electric signals. Lastly, a circuit board is installed in the housing for outputting the electric signals. In addition, a flat cable connects the photoelectric sensing device to the circuit board for transmitting the electric signals. The photoelectric sensing device is driven to scan the to-be-scanned document by repeating the procedure above and the scanning image is output as the scanning progress is completed. The flat cable is inclined to the center of the housing. The flat cable will touch the part of the loading glass under the top and outside the scan flatbed as the photoelectric sensing device is driven.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

The First Example

Figure 1A:
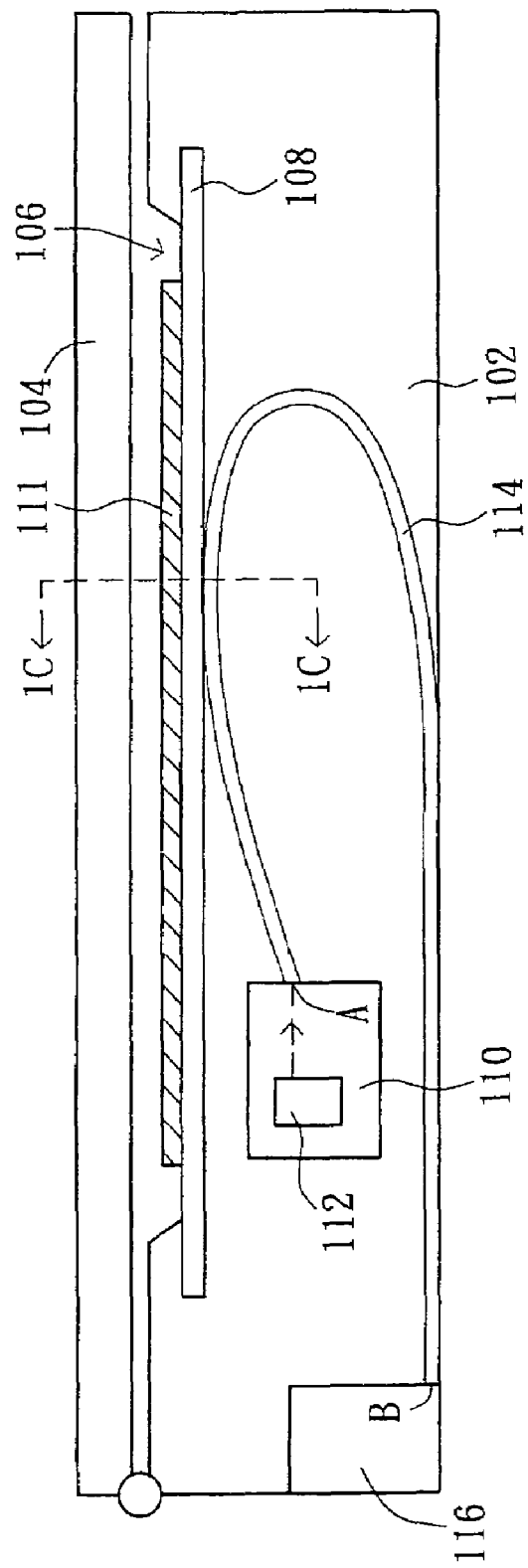
FIG. 1A (Prior Art) is a lateral view of a conventional flatbed scanner.
Figure 1C:
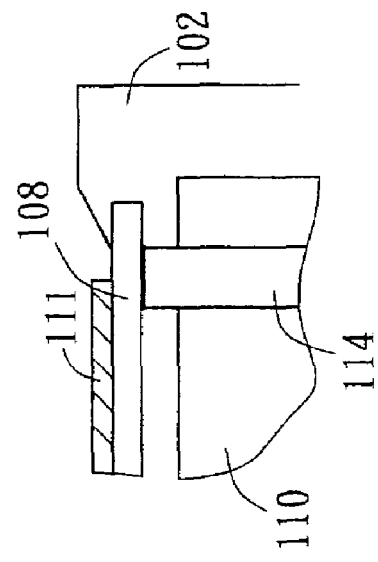
FIG. 1C (Prior Art) is a cross-sectional view of the conventional flatbed scanner, taken along line 1C-1C of FIG. 1A.
Figure 1B:
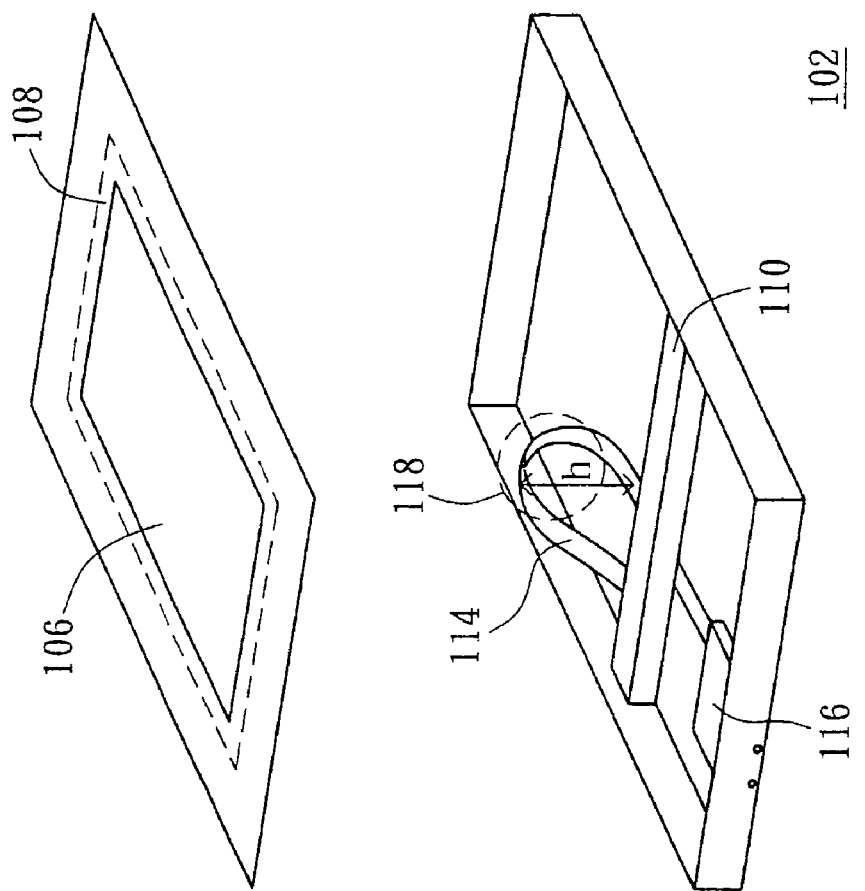
FIG. 1B (Prior Art) is a structural diagram showing the connection between the photoelectric sensing device and the motherboard in a conventional flatbed scanner.
Figure 2A:
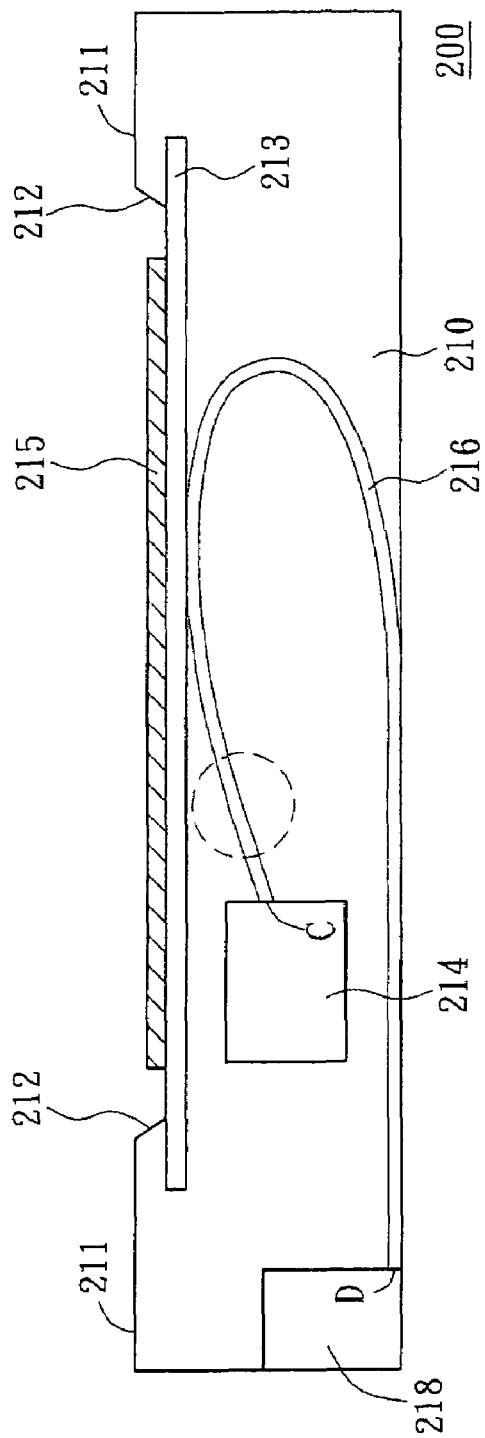
FIG. 2A is a lateral view of the scanning apparatus according to the first embodiment of the invention.

Referring to FIG. 2A, a lateral view of the scanning apparatus according to the first embodiment of the invention is shown. The scanning apparatus 200 including a housing 210, a scan flatbed 212, a photoelectric sensing device 214, a flat cable 216, and a motherboard 218. A loading glass 213 is installed at the scan flatbed 212 for loading a to-be-scanned document 215. When the document 215 is to be scanned, light signals from the to-be-scanned document 215 are sensed and transformed to electric signals by the photoelectric sensing device 214. Moreover, the electric signals are transmitted to the motherboard 218 by the flat cable 216 and then the first image is generated. The photoelectric sensing device 214 is driven to scan the to-be-scanned document 215 by repeating the procedure mentioned above until the final scanning image is output to complete the scanning progress.

Figure 2C:
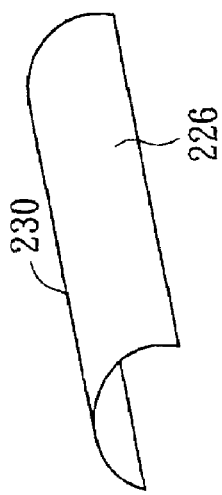
FIG. 2C is an enlarged partial view of the flat cable having a cambered surface in FIG. 2A.
Figure 2B:
FIG. 2B is an enlarged partial view of the flat cable with a line peak in FIG. 2A.

Referring to FIG. 2B, an enlarged partial view of the flat cable with a line peak in FIG. 2A or an enlarged view of the flat cable indicated by the dotted line in FIG. 2A is shown. The flat cable 216 bent around the bottom of photoelectric sensing device 214 includes a first terminal C connected to the photoelectric sensing device 214 and a second terminal D connected to the motherboard 218. The flat cable 216 is designed to include a fold peak 220 as shown in FIG. 2B so that when the photoelectric sensing device 214 carries the flat cable 216 and moves for operating a pre-scan or a scan, only the fold peak 220 of the flat cable 216 will touch the loading glass 213. Therefore, the surface abrasion of the loading glass 108 as described in the prior art can be reduced to line abrasion only and the quality of scanning images can be improved accordingly.

In addition, referring to FIG. 2C, an enlarged partial view of the flat cable having a cambered surface in FIG. 2A is shown. According to the same invention spirit, the flat cable can also be designed to have a cambered surface curved inwards as the flat cable 226 shown in FIG. 2C. In the same reason, when the flat cable 226 rubs against the loading glass 213, only the crest line 223 of the cambered surface makes a line friction with the loading glass 213 so that the quality of the scanning image can be improved.

As described above, the flat cable 216 with a line peak or the flat cable 226 having a cambered surface can be covered with an auxiliary sliding pad for rubbing against the loading glass 213. The auxiliary sliding pad can be made of Teflon. The friction coefficient between the auxiliary sliding pad and loading glass 213 is less than that between the flat cable 216 (or 226) and the loading glass 213 so that the line abrasion of the loading glass 213, as described above, can be further reduced.

The Second Example

Figure 3A:
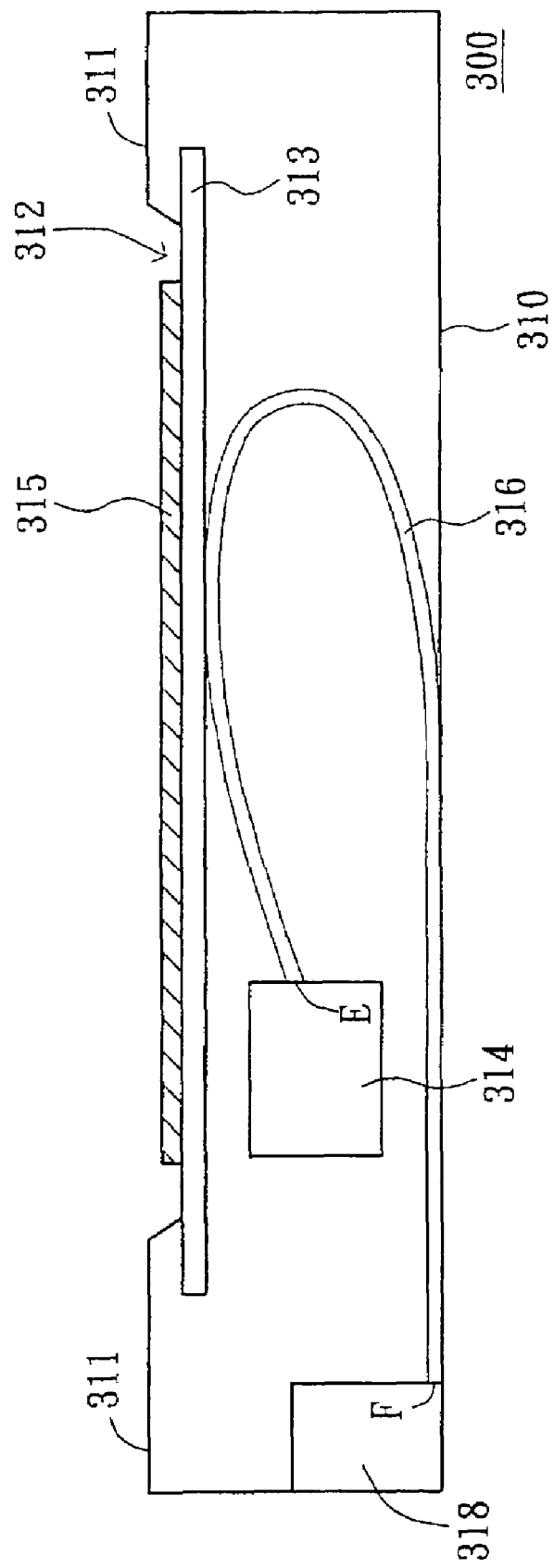
FIG. 3A is a lateral view of the scanning apparatus according to the second embodiment of the invention.

Referring to FIG. 3A, a lateral view of the scanning apparatus according to the second embodiment of the invention is shown. The scanning apparatus 300 includes a housing 310, a scan flatbed 312, a photoelectric sensing device 314, a flat cable 316, and a motherboard 318. A loading glass 313 is installed at the scan flatbed 312 for loading a to-be-scanned document 315. When the document 315 is to be scanned, light signals from the to-be-scanned document 315 are sensed and transformed to be electric signals by the photoelectric sensing device 314. Moreover, the electric signals are transmitted to the motherboard 318 by the flat cable 316 and then the first image is generated. The photoelectric sensing device 314 is driven to scan the to-be-scanned document 315 by repeating the procedure mentioned above until the final scanning image is output to complete the scanning progress.

Figure 3B:
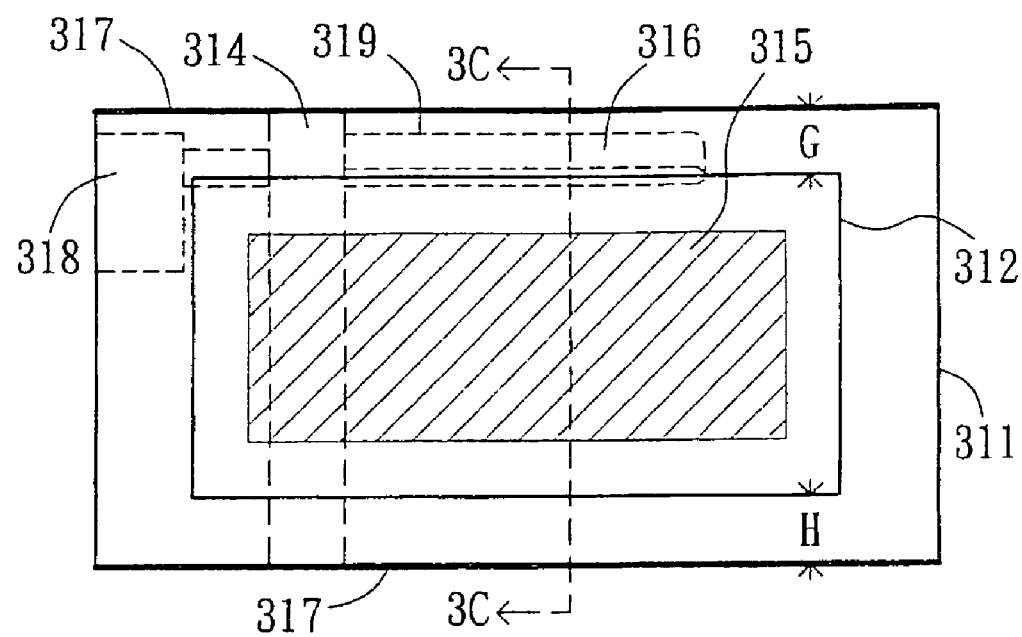
FIG. 3B is a top view of the scanning apparatus of FIG. 3A.
Figure 3C:
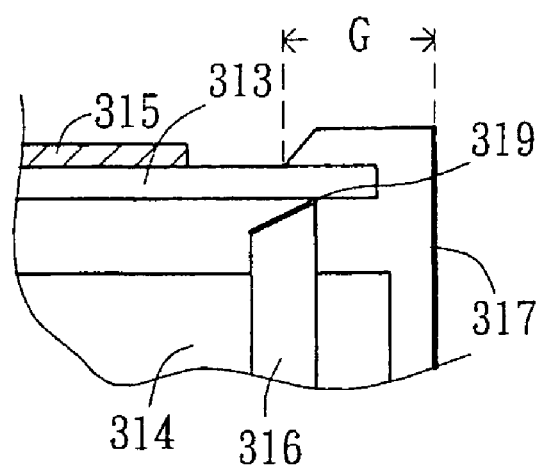
FIG. 3C is a cross-sectional view of the scanning apparatus, taken along line 3C-3C of FIG. 3B.
Figure 3D:
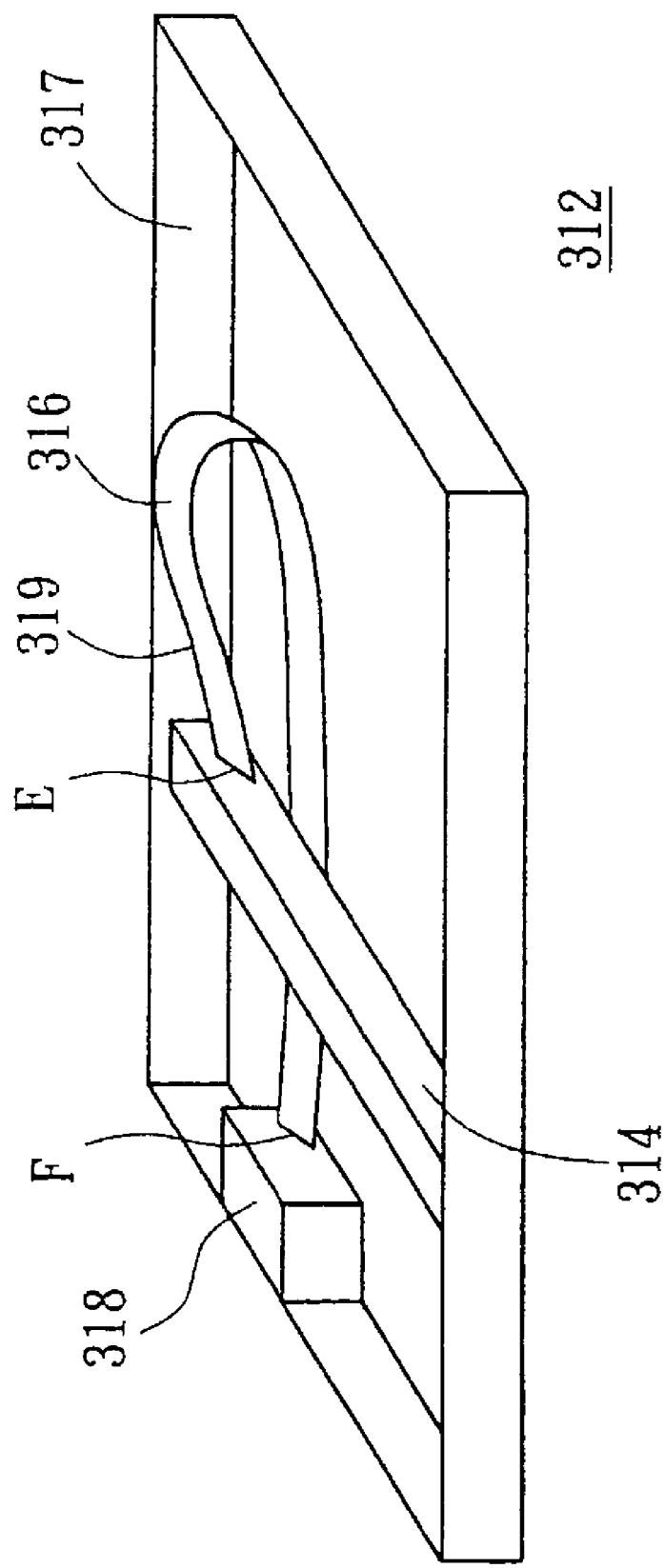
FIG. 3D is a schematic view showing the connection among the photoelectric sensing device, the flat cable, and the motherboard in FIG. 3B.

Referring to FIGS. 3A, 3B, and 3C at the same time, FIG. 3B is a top view of the scanning apparatus of FIG. 3A and FIG. 3C is a cross-sectional view of the scanning apparatus, taken along line 3C-3C of FIG. 3B. The flat cable 316 bent around the bottom of photoelectric sensing device 314 includes a first terminal F connected to the photoelectric sensing device 314 and a second terminal F connected to the motherboard 318. The major feature of the second preferred embodiment according to the invention is to adjust the location of the motherboard 318 to the available space near the sidewall 317 of the housing 310 such that the flat cable 316 is closer to the sidewall 317 of the housing 310. Moreover, the flat cable 316 is designed to incline to the center of the housing 310 as shown in FIG. 3C. In order to incline the flat cable 316, the first terminal F connected to the photoelectric sensing device 314 and the second terminal F connected to the motherboard 318 are also designed to incline at the same direction and the same angle with the flat cable 316 as shown in FIG. 3D. By means of the skillful design, the surface touch between the flat cable 316 and the loading glass 313 can be reduced to the line touch between the border 319 of the flat cable 316 near the sidewall 317 and the loading glass 313 as shown in FIG. 3C. Furthermore, the line touch between the flat cable 316 and the loading glass 313 can be adjusted to locate in the section under the top 311 and outside the scan flatbed 312 (as the G and H sections in FIG. 3B or the G section in FIG. 3C). Therefore, when the photoelectric sensing device 314 carries the flat cable 316 and moves for operating a pre-scan or a scan, even the flat cable 316 will rub against the loading glass 313, the friction traces will remain on the sections G and H of the loading glass 313. Since no shadow traces will produce on the scanning images, the quality of the scanning images will be further improved.

The scanning apparatus according to the invention has the following advantages: The surface friction between the flat cable and the loading glass is reduced to a line friction by means of the fold peak or cambered surface design. In addition, the rearrangement of the photoelectric sensing device and the design of inclined flat cable skillfully change, the surface touch between the flat cable and the loading glass into line touch outside the scan flatbed. therefore, the friction traces remained on the loading glass will not affect the quality of the scanning image corresponding to the document to be scanned in the scan flatbed. In conclusion, the scanning apparatus with a simple design can optimize the quality of the scanning images.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scanning apparatus flat cable, comprising:
a folded portion including a fold peak, wherein only the fold peak touches a loading glass portion of a scanning apparatus when the flat cable is implemented in the scanning apparatus.

2. The scanning apparatus flat cable of claim 1, wherein the flat cable is configured to couple to a photoelectric sensing device of the scanning apparatus.

3. The scanning apparatus flat cable of claim 2, wherein the photoelectric sensing device of the scanning apparatus comprises a contact image sensor (CIS).

4. The scanning apparatus flat cable of claim 2, wherein the photoelectric sensing device of the scanning apparatus comprises a charge coupled device (CCD).

5. The scanning apparatus flat cable of claim 2, wherein the flat cable is configured to couple to a circuit board of the scanning apparatus.

6. The scanning apparatus flat cable of claim 5, wherein the circuit board of the scanning apparatus comprises a motherboard.

7. The scanning apparatus flat cable of claim 1, wherein the flat cable is substantially coated with an auxiliary sliding pad.

8. The scanning apparatus flat cable of claim 7, wherein the auxiliary sliding pad is comprised of Teflon®.

9. A scanning apparatus flat cable, comprising:
a cambered portion including a crest line, wherein only the crest line touches a loading glass portion of a scanning apparatus when the flat cable is implemented in the scanning apparatus.

10. The scanning apparatus flat cable of claim 9, wherein the flat cable is configured to couple to a photoelectric sensing device of the scanning apparatus.

11. The scanning apparatus flat cable of claim 10, wherein the photoelectric sensing device of the scanning apparatus comprises a contact image sensor (CIS).

12. The scanning apparatus flat cable of claim 10, wherein the photoelectric sensing device of the scanning apparatus comprises a charge coupled device (CCD).

13. The scanning apparatus flat cable of claim 10, wherein the cable is configured to couple to a circuit board of the scanning apparatus.

14. The scanning apparatus flat cable of claim 13, wherein the circuit board of the scanning apparatus comprises a motherboard.

15. The scanning apparatus flat cable of claim 9, wherein the flat cable is substantially coated with an auxiliary sliding pad.

16. The scanning apparatus flat cable of claim 15, wherein the auxiliary sliding pad is comprised of Teflon®.

17. A scanning apparatus, comprising:
a housing having a scan flatbed;
a loading glass coupled to the scan flatbed to receive a scanning document;
a photoelectric sensing device, positioned in the housing, for sensing a light signal and generating an electric signal;
a step motor coupled to the photoelectric sensing device to move the photoelectric sensing device;
a motherboard, positioned in the housing, for receiving the electric signal; and
a cable for transmitting the electric signal from the photoelectric sensing device to the motherboard, wherein the cable comprises a first border and a second border, wherein the first border is positioned closer to the loading glass than the second border, and wherein only the first border touches the loading glass when the photoelectric sensing device is driven by the step motor.

18. The scanning apparatus of claim 17, wherein the photoelectric sensing device comprises a contact image sensor (CIS).

19. The scanning apparatus of claim 17, wherein the photoelectric sensing device comprises a charge coupled device (CCD).

20. The scanning apparatus of claim 17, wherein the scanning document comprises a reflective document.

21. The scanning apparatus of claim 17, wherein the scanning document comprises a transmissive document.

22. A scanning apparatus having a housing with a scan flatbed and a loading glass coupled to the scan flatbed for receiving a to-be-scanned document, the scanning apparatus comprising:
a photoelectric sensing device, positioned in the housing, to sense a light signal corresponding to the to-be-scanned document, and to generate an electric signal;
a circuit board, positioned in the housing, to receive the electric signal; and
a cable having a line peak portion, wherein the cable couples the photoelectric sensing device to the circuit board and transmits the electric signal;
wherein the line peak portion of the cable contacts the loading glass when the photoelectric sensing device is driven.

23. The scanning apparatus of claim 22, wherein the photoelectric sensing device comprises a contact image sensor (CIS).

24. The scanning apparatus of claim 22, wherein the photoelectric sensing device comprises a charge coupled device (CCD).

25. The scanning apparatus of claim 22, wherein the to-be-scanned document comprises a reflective document.

26. The scanning apparatus of claim 22, wherein the to-be-scanned document comprises a transmissive document.

27. The scanning apparatus of claim 22, wherein the circuit board comprises a motherboard.

28. The scanning apparatus of claim 22, wherein the line peak portion comprises a fold peak.

29. The scanning apparatus of claim 28, wherein the cable is substantially covered with an auxiliary sliding pad.

30. The scanning apparatus of claim 29, wherein the auxiliary sliding pad is substantially comprised of Teflon®.

31. The scanning apparatus of claim 22, wherein the cable has a cambered surface.

32. The scanning apparatus of claim 31, wherein the line peak portion comprises a crest line of the cambered surface.

33. The scanning apparatus claim 32, wherein the cable is substantially covered with an auxiliary sliding pad.

34. The scanning apparatus claim of 33, wherein the auxiliary sliding pad is substantially comprised of Teflon®.

* * * * *

UNITED STATES PATENT AND TRADEMARK OFFICE
CERTIFICATE OF CORRECTION

PATENT NO. : 7,450,276 B2 Page 1 of 1
APPLICATION NO. : 11/505563
DATED : November 11, 2008
INVENTOR(S) : Yu-Shan Chang It is certified that error appears in the above-identified patent and that said Letters Patent is hereby corrected as shown below:

In the Claims:

Column 8, line 1, in Claim 33:   After "apparatus" insert --of--; and

Column 8, line 3, in Claim 34:   Delete "claim of" and insert --of claim--, therefor.

Signed and Sealed this

Twelfth Day of October, 2010

David J. Kappos
*Director of the United States Patent and Trademark Office*